(12) United States Patent
Kodera

(10) Patent No.: US 11,485,409 B2
(45) Date of Patent: Nov. 1, 2022

(54) STEERING CONTROL DEVICE

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 323 days.

(21) Appl. No.: 16/846,587

(22) Filed: Apr. 13, 2020

(65) Prior Publication Data

US 2020/0324808 A1 Oct. 15, 2020

(30) Foreign Application Priority Data

Apr. 15, 2019 (JP) .............................. JP2019-076809

(51) Int. Cl.
*B62D 5/04* (2006.01)
*B62D 5/00* (2006.01)

(52) U.S. Cl.
CPC ........... *B62D 5/0463* (2013.01); *B62D 5/005* (2013.01); *B62D 5/0418* (2013.01)

(58) Field of Classification Search
CPC ..... B62D 5/0463; B62D 5/005; B62D 5/0418
See application file for complete search history.

(56) References Cited

U.S. PATENT DOCUMENTS

| 2015/0203147 | A1* | 7/2015 | Kuramochi | .......... B62D 5/0496 |
| | | | | 701/41 |
| 2015/0217801 | A1* | 8/2015 | Takeda | ................... B62D 6/003 |
| | | | | 701/42 |
| 2016/0129934 | A1* | 5/2016 | Akatsuka | ............. B62D 15/025 |
| | | | | 180/446 |
| 2016/0159388 | A1* | 6/2016 | Sekiya | ................. B62D 5/0409 |
| | | | | 180/446 |
| 2017/0190354 | A1 | 7/2017 | Ko | |

FOREIGN PATENT DOCUMENTS

| GB | 2552080 A | 1/2018 |
| JP | 2015-033942 A | 2/2015 |

OTHER PUBLICATIONS

Sep. 15, 2020 Search Report issued in European Patent Application No. 20169445.2.

* cited by examiner

*Primary Examiner* — Jacob D Knutson

(74) *Attorney, Agent, or Firm* — Oliff PLC

(57) ABSTRACT

A steering control device is configured to control a motor, the motor being a generation source of a driving force that is given to a steering mechanism of a vehicle. The steering control device includes a controller configured to compute a controlled variable depending on a steering state, the controlled variable being used in the control of the motor. The controller is configured to alter a control parameter for the controller, based on a command that is generated by a host control device depending on a purpose of an intervention in a steering control, the host control device being mounted on the vehicle.

16 Claims, 5 Drawing Sheets

STEERING CONTROL DEVICE

CROSS-REFERENCE TO RELATED APPLICATION

This application claims priority to Japanese Patent Application No. 2019-076809 filed on Apr. 15, 2019, incorporated herein by reference in its entirety.

BACKGROUND

1. Technical Field

The present disclosure relates to a steering control device.

2. Description of Related Art

There is an electric power steering apparatus (EPS) that gives the torque of a motor, as an assist force, to a steering mechanism of a vehicle. In recent years, there has been actively performed development of an automatic driving system that realizes various driving assist functions for improving safety or convenience of the vehicle or an automatic driving function by which the system performs driving instead of a driver. A control device of the automatic driving system evaluates an optimal control method based on the state of the vehicle at that time, and commands control devices of in-vehicle systems to perform individual controls depending on the evaluated control method. The control device of the EPS controls the drive of the motor, based on a command value that is generated by the control device of the automatic driving system.

For example, a control device of an EPS described in Japanese Unexamined Patent Application Publication No. 2015-33942 (JP 2015-33942 A) generates an assist command for generating an assist torque that decreases a steering load depending on a detection value of a steering torque. Further, the control device of the EPS acquires a target value of a physical quantity that is relevant to steering and that is generated by the automatic driving system, and generates a following-up command for generating an automatic steering torque that causes a detection value of the physical quantity to follow up the target value. Then, the control device of the EPS drives a motor that generates the assist torque and the automatic steering torque, in accordance with an addition value of the assist command and the following-up command. The control device of the EPS changes responsiveness of a target following-up control, depending on the degree of intervention in the following-up control by the driver and the degree of intervention in the assist control by the automatic driving system.

Therefore, for example, when the intervention by the driver is detected in the case where the target following-up control with a high responsiveness is being executed, it is possible to easily realize the intervention by the driver, by decreasing the responsiveness of the target following-up control. Conversely, when the intervention by the automatic driving system is detected in the case where the assist control with a low responsiveness is being executed, it is possible to secure a responsiveness necessary for the target following-up control, by improving the responsiveness of the target following-up control. Accordingly, when the driver or the automatic driving system intervenes in a control that is being currently executed, it is possible to switch the control, without giving a strangeness feeling to the driver.

SUMMARY

As contents of steering controls that are executed by the control device, there are various contents, including the target following-up control in JP 2015-33942 A. Therefore, the control device of the EPS is required to have a more appropriate control characteristic depending on the content of the steering control. For example, from a standpoint of a quicker execution of the steering control, it is desirable for the responsiveness to be higher. Further, from a standpoint of enhancement of silence, it is desirable for the responsiveness to be lower. That is, the responsiveness and the silence have a so-called trade-off (antinomy) relation. Therefore, for example, in the case where the control device of the EPS has a steering control function requiring the responsiveness and a steering control function requiring the silence, it is difficult to achieve both of control characteristics appropriate to the steering control functions.

A control device of a so-called steer-by-wire type steering apparatus, in which dynamic force transmission between a steering wheel and turning wheels is isolated, has also the same problem as the control device of the EPS. The present disclosure provides a steering control device that makes it possible to obtain a more appropriate control characteristic depending on the control content.

A steering control device according to an aspect of the present disclosure is configured to control a motor, the motor being a generation source of a driving force that is given to a steering mechanism of a vehicle. The steering control device includes a controller configured to compute a controlled variable depending on a steering state, the controlled variable being used in the control of the motor. The controller is configured to alter a control parameter for the controller, based on a command that is generated by a host control device depending on a purpose of an intervention in a steering control, the host control device being mounted on the vehicle.

With the steering control device according to the aspect of the present disclosure, the control parameter for the controller is altered depending on the purpose of the intervention in the steering control by the host control device. Therefore, it is possible to obtain a more appropriate control characteristic depending on the purpose of the intervention in the steering control by the host control device.

In the steering control device according to the aspect of the present disclosure, the controller may be configured to compute the controlled variable by executing a feedback control to cause a detection value of a physical quantity to follow up a target value of the physical quantity, the physical quantity changing depending on an action of the steering mechanism.

With the steering control device according to the aspect of the present disclosure, since the control parameter for the controller is altered depending on the purpose of the intervention in the steering control by the host control device, the responsiveness of the feedback control for the physical quantity that changes depending on the action of the steering mechanism is altered. Therefore, it is possible to obtain a more appropriate responsiveness depending on the purpose of the intervention by the host control device, as the responsiveness of the feedback control for the physical quantity that changes depending on the action of the steering mechanism.

The steering control device according to the aspect of the present disclosure may be configured to control the motor including a turning motor that generates a turning force for turning a turning wheel as the driving force that is given to a turning shaft of the steering mechanism. The turning shaft may be configured to turn the turning wheel. Dynamic force transmission between a steering wheel and the turning wheel may be isolated. The controller may be configured to compute the controlled variable by executing a feedback control to cause a detection value of a physical quantity to follow up a target value of the physical quantity, the physical quantity changing depending on a turning action of the turning wheel.

With the steering control device according to the aspect of the present disclosure, since the control parameter for the controller is altered depending on the purpose of the intervention in the steering control by the host control device, the responsiveness of the feedback control for the physical quantity that changes depending on the turning action of the turning wheel is altered. Therefore, it is possible to obtain a more appropriate responsiveness depending on the purpose of the intervention by the host control device, as the responsiveness of the feedback control for the physical quantity that changes depending on the turning action of the turning wheel. Furthermore, it is possible to obtain a more appropriate turning control characteristic depending on the purpose of the intervention by the host control device.

In the steering control device according to the aspect of the present disclosure, the controller may be configured to compute the controlled variable by executing at least one of a feedback control to cause a detection value of an electric current to follow up a target value of the electric current and a feedback control to cause a detection value of a rotation angle of a shaft to follow up a target value of the rotation angle of the shaft, the electric current being supplied to the turning motor, the shaft rotating depending on the turning action of the turning wheel.

With the steering control device according to the aspect of the present disclosure, since the control parameter for the controller is altered depending on the purpose of the intervention in the steering control by the host control device, the responsiveness of at least one of the feedback control for the electric current that is supplied to the turning motor and the feedback control for the rotation angle of the shaft that rotates depending on the turning action of the turning wheel is altered. Therefore, it is possible to obtain a more appropriate responsiveness depending on the purpose of the intervention by the host control device, as the responsiveness of the feedback control for at least one of the electric current that is supplied to the turning motor and the rotation angle of the shaft that rotates depending on the turning action of the turning wheel. Furthermore, it is possible to obtain a more appropriate turning control characteristic depending on the purpose of the intervention by the host control device.

The steering control device according to the aspect of the present disclosure may be configured to control the motor including a reaction motor that generates a steering reaction force as the driving force that is given to a steering shaft of the steering mechanism. The steering shaft may be configured to rotate in conjunction with an operation of a steering wheel. Dynamic force transmission between a turning wheel and the steering shaft may be isolated. The steering reaction force may be a torque in an opposite direction of a steering direction. The controller may be configured to compute the controlled variable by executing a feedback control to cause a detection value of a physical quantity to follow up a target value of the physical quantity, the physical quantity changing depending on the operation of the steering wheel.

With the steering control device according to the aspect of the present disclosure, since the control parameter for the controller is altered depending on the purpose of the intervention in the steering control by the host control device, the responsiveness of the feedback control for the physical quantity that changes depending on the operation of the steering wheel is altered. Therefore, it is possible to obtain a more appropriate responsiveness depending on the purpose of the intervention by the host control device, as the responsiveness of the feedback control for the physical quantity that changes depending on the operation of the steering wheel. Furthermore, it is possible to obtain a more appropriate steering reaction force control characteristic depending on the purpose of the intervention by the host control device.

In the steering control device according to the aspect of the present disclosure, the controller may be configured to compute the controlled variable by executing at least one of a feedback control to cause a detection value of an electric current to follow up a target value of the electric current and a feedback control to cause a detection value of a rotation angle of the steering shaft to follow up a target value of the rotation angle of the steering shaft, the electric current being supplied to the reaction motor.

With the steering control device according to the aspect of the present disclosure, since the control parameter for the controller is altered depending on the purpose of the intervention in the steering control by the host control device, the responsiveness of at least one of the feedback control for the electric current that is supplied to the reaction motor and the feedback control for the rotation angle of the steering shaft is altered. Therefore, it is possible to obtain a more appropriate responsiveness depending on the purpose of the intervention by the host control device, as the responsiveness of the feedback control for at least one of the electric current that is supplied to the reaction motor and the rotation angle of the steering shaft. Furthermore, it is possible to obtain a more appropriate steering reaction force control characteristic depending on the purpose of the intervention by the host control device.

The steering control device according to the aspect of the present disclosure may be configured to control an assist motor that generates a steering assist force as the driving force that is given to a shaft or a turning shaft of the steering mechanism. The shaft may be configured to rotate in conjunction with an operation of a steering wheel. The turning shaft may be configured to turn a turning wheel in conjunction with a rotation of the shaft. The steering assist force may be a torque in the same direction as a steering direction. The controller may be configured to compute the controlled variable by executing a feedback control to cause a detection value of a physical quantity to follow up a target value of the physical quantity, the physical quantity changing depending on the operation of the steering wheel.

With the steering control device according to the aspect of the present disclosure, since the control parameter for the controller is altered depending on the purpose of the intervention in the steering control by the host control device, the responsiveness of the feedback control for the physical quantity that changes depending on the operation of the steering wheel is altered. Therefore, it is possible to obtain a more appropriate responsiveness depending on the purpose of the intervention by the host control device, as the responsiveness of the feedback control for the physical quantity that changes depending on the operation of the steering wheel. Furthermore, it is possible to obtain a more appropriate steering assist control characteristic depending on the purpose of the intervention by the host control device.

In the steering control device according to the aspect of the present disclosure, the controller may be configured to compute the controlled variable by executing at least one of a feedback control to cause a detection value of an electric current to follow up a target value of the electric current and a feedback control to cause a detection value of a rotation angle of the shaft to follow up a target value of the rotation angle of the shaft, the electric current being supplied to the assist motor, the shaft rotating in conjunction with the operation of the steering wheel.

With the steering control device according to the aspect of the present disclosure, since the control parameter for the controller is altered depending on the purpose of the intervention in the steering control by the host control device, the responsiveness of at least one of the feedback control for the electric current that is supplied to the assist motor and the feedback control for the rotation angle of the shaft that rotates in conjunction with the operation of the steering wheel is altered. Therefore, it is possible to obtain a more appropriate responsiveness depending on the purpose of the intervention by the host control device, as the responsiveness of the feedback control for at least one of the electric current that is supplied to the assist motor and the rotation angle of the shaft that rotates in conjunction with the operation of the steering wheel. Furthermore, it is possible to obtain a more appropriate steering assist control characteristic depending on the purpose of the intervention by the host control device.

With the steering control device according to the aspect of the present disclosure, it is possible to obtain a more appropriate control characteristic depending on the control content.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

A first embodiment in which a steering control device is applied to a steer-by-wire type steering apparatus will be described below.

Figure 1:
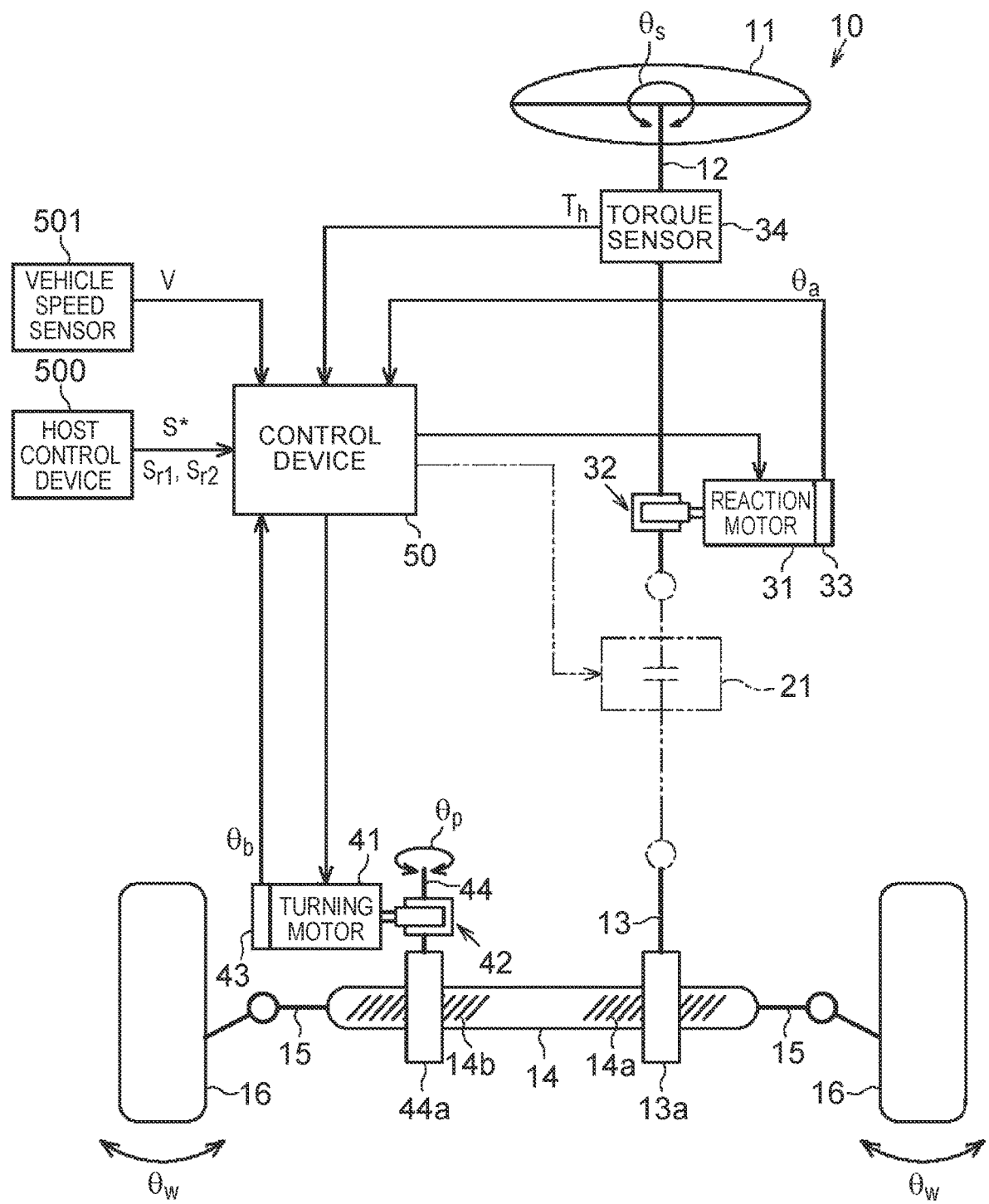
FIG. 1 is a configuration diagram of a steer-by-wire type steering apparatus that is equipped with a first embodiment of a steering control device.

As shown in FIG. 1, a steering apparatus 10 of a vehicle includes a steering shaft 12 that is coupled to a steering wheel 11. The steering shaft 12 constitutes a steering mechanism. Further, the steering apparatus 10 includes a turning shaft 14 that extends along a vehicle width direction (a right-left direction in FIG. 1). Right and left turning wheels 16 are coupled to both ends of the turning shaft 14 through tie rods 15, respectively. A turning angle θw of the turning wheels 16 is altered by linear motion of the turning shaft 14.

Configuration for Generating Steering Reaction Force: Reaction Unit

The steering apparatus 10 includes a reaction motor 31, a speed reducer 32, a rotation angle sensor 33 and a torque sensor 34, as a configuration for generating a steering reaction force. Incidentally, the steering reaction force is a force (torque) that acts in an opposite direction of a direction of driver's operation of the steering wheel 11. By giving the steering reaction force to the steering wheel 11, it is possible to cause the driver to feel an appropriate amount of reaction force (it is possible to give the driver an appropriate road feel).

The reaction motor 31 is a generation source of the steering reaction force. As the reaction motor 31, for example, a brushless motor having three phases (U, V and W) is employed. The reaction motor 31 (a rotation shaft of the reaction motor 31, to be exact) is coupled to the steering shaft 12 through the speed reducer 32. The speed reducer 32 is provided at a portion that is on the steering shaft 12 and that is closer to the steering wheel 11 than a clutch 21 is. The torque of the reaction motor 31 is given to the steering shaft 12 as the steering reaction force.

The rotation angle sensor 33 is provided on the reaction motor 31. The rotation angle sensor 33 detects a rotation angle θ a of the reaction motor 31. The rotation angle θ a of the reaction motor 31 is used for the computation of a steer angle (steering angle) θs. The reaction motor 31 and the steering shaft 12 interlock with each other through the speed reducer 32. Therefore, the rotation angle θ a of the reaction motor 31 has a correlation with the rotation angle of the steering shaft 12 and furthermore the steer angle θs that is the rotation angle of the steering wheel 11. Accordingly, it is possible to evaluate the steer angle θs based on the rotation angle θ a of the reaction motor 31.

The torque sensor 34 detects a steering torque Th that is applied to the steering shaft 12 by a rotation operation of the steering wheel 11. The torque sensor 34 is provided at a portion that is on the steering shaft 12 and that is closer to the steering wheel 11 than the speed reducer 32 is.

Configuration for Generating Turning Force: Turning Unit

The steering apparatus 10 includes a turning motor 41, a speed reducer 42 and a rotation angle sensor 43, as a configuration for generating a turning force that is a dynamic force for turning the turning wheels 16.

The turning motor 41 is a generation source of the turning force. As the turning motor 41, for example, a brushless motor having three phases is employed. The turning motor 41 (a rotation shaft of the turning motor 41, to be exact) is coupled to a pinion shaft 44 through the speed reducer 42. A pinion gear 44a of the pinion shaft 44 engages with a rack gear 14b of the turning shaft 14. The torque of the turning motor 41 is given to the turning shaft 14 through the pinion shaft 44, as the turning force. In response to the rotation of the turning motor 41, the turning shaft 14 moves along the vehicle width direction (the right-left direction in the figure).

The rotation angle sensor 43 is provided on the turning motor 41. The rotation angle sensor 43 detects a rotation angle θb of the turning motor 41. Incidentally, the steering apparatus 10 includes a pinion shaft 13. The pinion shaft 13 is provided so as to cross the turning shaft 14. A pinion gear 13a of the pinion shaft 13 engages with a rack gear 14a of the turning shaft 14. The reason why the pinion shaft 13 is provided is that the pinion shaft 13 supports the turning shaft 14 within a housing (not illustrated) together with the pinion shaft 44. That is, by a support mechanism (not illustrated) provided in the steering apparatus 10, the turning shaft 14 is supported such that the turning shaft 14 can move along an axial direction of the turning shaft 14, and is pressed toward the pinion shafts 13, 44. Thereby, the turning shaft 14 is supported within the housing. However, there may be provided another support mechanism that supports the turning shaft 14 within the housing without using the pinion shaft 13.

Control Device

The steering apparatus 10 includes a control device 50. The control device 50 controls the reaction motor 31 and the turning motor 41, based on detection results of various sensors. As the sensors, there is a vehicle speed sensor 501, in addition to the above-described rotation angle sensor 33, torque sensor 34 and rotation angle sensor 43. The vehicle speed sensor 501, which is provided in the vehicle, detects a vehicle speed V that is the traveling speed of the vehicle.

The control device 50 executes a reaction force control to generate the steering reaction force corresponding to the steering torque Th, through a drive control of the reaction motor 31. The control device 50 computes a target steering reaction force based on the steering torque Th and the vehicle speed V, and computes a target steering angle of the steering wheel 11 based on the computed target steering reaction force, the steering torque Th and the vehicle speed V. The control device 50 computes a steer angle correction amount through a feedback control of the steer angle $\theta s$ that is executed such that the actual steer angle $\theta s$ follows up the target steer angle, and computes a steering reaction force command value by adding the computed steer angle correction amount to the target steering reaction force. The control device 50 supplies an electric current necessary to generate the steering reaction force corresponding to the steering reaction force command value, to the reaction motor 31.

The control device 50 executes a turning control to turn the turning wheels 16 depending on a steering state, through a drive control of the turning motor 41. The control device 50 computes a pinion angle $\theta p$ that is the actual rotation angle of the pinion shaft 44, based on the rotation angle $\theta b$ of the turning motor 41 that is detected through the rotation angle sensor 43. The pinion angle $\theta p$ is a value that reflects the turning angle $\theta w$ of the turning wheels 16. The control device 50 computes a target pinion angle, using the above-described target steering angle. Then, the control device 50 evaluates the deviation between the target pinion angle and the actual pinion angle $\theta p$, and controls electricity supply for the turning motor 41 such that the deviation is eliminated.

The vehicle can be equipped with an automatic driving system that realizes various driving assist function for improving safety or convenience of the vehicle or an automatic driving function by which the system performs driving instead of a driver. In this case, in the vehicle, a cooperation control is performed by the control device 50 and a control device of another in-vehicle system. The cooperation control is a technology in which control devices of multiple kinds of in-vehicle systems control the action of the vehicle in cooperation with each other. For example, the vehicle is equipped with a host control device 500 that integrally controls control devices of various in-vehicle systems. The host control device 500 evaluates an optimal control method based on the state of the vehicle at that time, and commands the in-vehicle control devices to perform individual controls depending on the evaluated control method.

The host control device 500 intervenes in the steering control by the control device 50. The host control device 500 switches an automatic driving control function of the host control device 500 between an on-state (enabling) and an off-state (disabling), through an operation of an unillustrated switch that is provided at a driver's seat or the like. In recent years, there are various driving assists. In the embodiment, the driving assist is classified into a first driving assist and a second driving assist, based on difference in a control characteristic that is required of the control device 50. For example, the first driving assist includes a lane departure prevention assist, a collision avoidance assist and the like. The second driving assist includes a parking assist and the like. In a control for performing the first driving assist, responsiveness (following-up property) is required as the control characteristic. In a control for performing the second driving assist, silence is required as the control characteristic.

The host control device 500 computes individual command values for contents of the driving assist, and generates a final command value S* by summing up the individual command values. In the embodiment, the host control device 500 computes a command value S1* for performing the first driving assist and a command value S2* for performing the second driving assist, and generates the final command value S* by summing up the command values S1*, S2*. Each of the command values S1*, S2*, S* is an additional angle command value. The additional angle command value is a target value of the steering angle (an angle that needs to be added to the current steering angle) that is necessary for the traveling of the vehicle along a target lane depending on a traveling state at that time. The control device 50 controls the reaction motor 31 and the turning motor 41, using the command value S* computed by the host control device 500.

The host control device 500 generates flags as commands Sr1, Sr2 for the control device 50, for each content of the driving assist. The command Sr1 is information indicating whether a first driving assist control function is in the on-state or in the off-state. The command Sr2 is information indicating whether a second driving assist control function is in the on-state or in the off-state. When the first driving assist control function and the second driving assist control function are in the on-state, the host control device 500 sets the values of the flags as the commands Sr1, Sr2, to "1". When the first driving assist control function and the second driving assist control function are in the off-state, the host control device 500 sets the values of the flags as the commands Sr1, Sr2, to "0".

Detailed Configuration of Control Device

Figure 2:
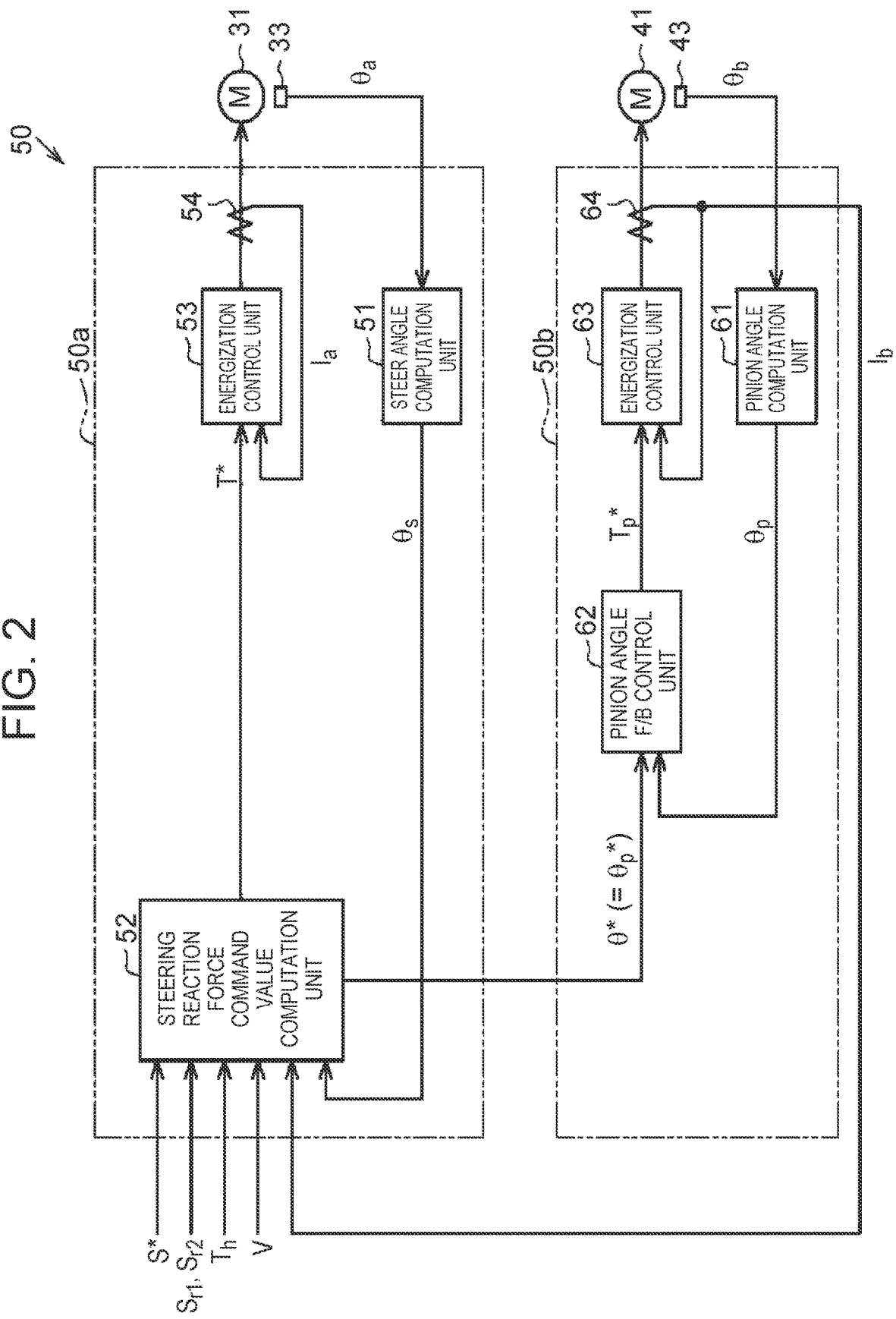
FIG. 2 is a control block diagram of the first embodiment of the steering control device.

Next, the control device 50 will be described in detail. As shown in FIG. 2, the control device 50 includes a reaction force control unit 50a that executes the reaction force control, and a turning control unit 50b that executes the turning control.

Reaction Force Control Unit

The reaction force control unit 50a includes a steer angle computation unit 51, a steering reaction force command value computation unit 52 and an energization control unit 53.

The steer angle computation unit 51 computes the steer angle $\theta s$ of the steering wheel 11, based on the rotation angle $\theta a$ of the reaction motor 31 that is detected through the rotation angle sensor 33. The steering reaction force command value computation unit 52 computes a steering reaction force command value T* based on the steering torque Th, the vehicle speed V and the steer angle $\theta s$. The steering reaction force command value computation unit 52 computes the steering reaction force command value T* having a larger absolute value, as the absolute value of the steering torque Th is larger and the vehicle speed V is lower. Incidentally, the steering reaction force command value computation unit 52 computes the target steer angle θ* of the steering wheel 11 in the course of the computation of the steering reaction force command value T*. The steering reaction force command value computation unit 52 will be described later in detail.

The energization control unit 53 supplies an electric power corresponding to the steering reaction force command value T*, to the reaction motor 31. Specifically, the energization control unit 53 computes a current command value for the reaction motor 31, based on the steering reaction force command value T*. Further, the energization control unit 53 detects the value of an actual electric current Ia that is generated in an electricity supply path to the reaction motor 31, through a current sensor 54 provided on the electricity supply path. The value of the electric current Ia is the value of the actual electric current that is supplied to the reaction motor 31. Then, the energization control unit 53 evaluates the deviation between the current command value and the value of the actual electric current Ia, and controls electricity supply for the reaction motor 31 such that the deviation is eliminated (a feedback control of the electric current Ia). Thereby, the reaction motor 31 generates the torque corresponding to the steering reaction force command value T*. It is possible to cause the driver to feel an appropriate amount of the reaction force of a road surface (it is possible to give the driver an appropriate road feel).

Turning Control Unit

The turning control unit 50b includes a pinion angle computation unit 61, a pinion angle feedback control unit 62 and an energization control unit 63.

The pinion angle computation unit 61 computes the pinion angle θp that is the actual rotation angle of the pinion shaft 44, based on the rotation angle θb of the turning motor 41 that is detected through the rotation angle sensor 43. The turning motor 41 and the pinion shaft 44 interlock with each other through the speed reducer 42. Therefore, there is a correlation between the rotation angle θb of the turning motor 41 and the pinion angle θp. By using this correlation, it is possible to evaluate the pinion angle θp from the rotation angle θb of the turning motor 41. Further, the pinion shaft 44 engages with the turning shaft 14. Therefore, there is a correlation between the pinion angle θp and the moving amount of the turning shaft 14. That is, the pinion angle θp is a value that reflects the turning angle θw of the turning wheels 16.

The pinion angle feedback control unit 62 takes in the target steer angle θ* computed by the steering reaction force command value computation unit 52, as a target pinion angle θp*. Further, the pinion angle feedback control unit 62 takes in the actual pinion angle θp computed by the pinion angle computation unit 61. The pinion angle feedback control unit 62 computes a pinion angle command value Tp*, through a feedback control of the pinion angle θp, such that the actual pinion angle θp follows up the target pinion angle θp* (which is equal to the target steer angle θ* in the embodiment).

The energization control unit 63 supplies an electric power corresponding to the pinion angle command value Tp*, to the turning motor 41. Specifically, the energization control unit 63 computes a current command value for the turning motor 41, based on the pinion angle command value Tp*. Further, the energization control unit 63 detects the value of an actual electric current Ib that is generated in an electricity supply path to the turning motor 41, through a current sensor 64 provided on the electricity supply path. The value of the electric current Ib is the value of the actual electric current that is supplied to the turning motor 41. Then, the energization control unit 63 evaluates the deviation between the current command value and the value of the actual electric current Ib, and controls the electricity supply for the turning motor 41 such that the deviation is eliminated (a feedback control of the current value Ib). Thereby, the turning motor 41 rotates by an angle corresponding to the pinion angle command value Tp*.

Steering Reaction Force Command Value Computation Unit

Figure 3:
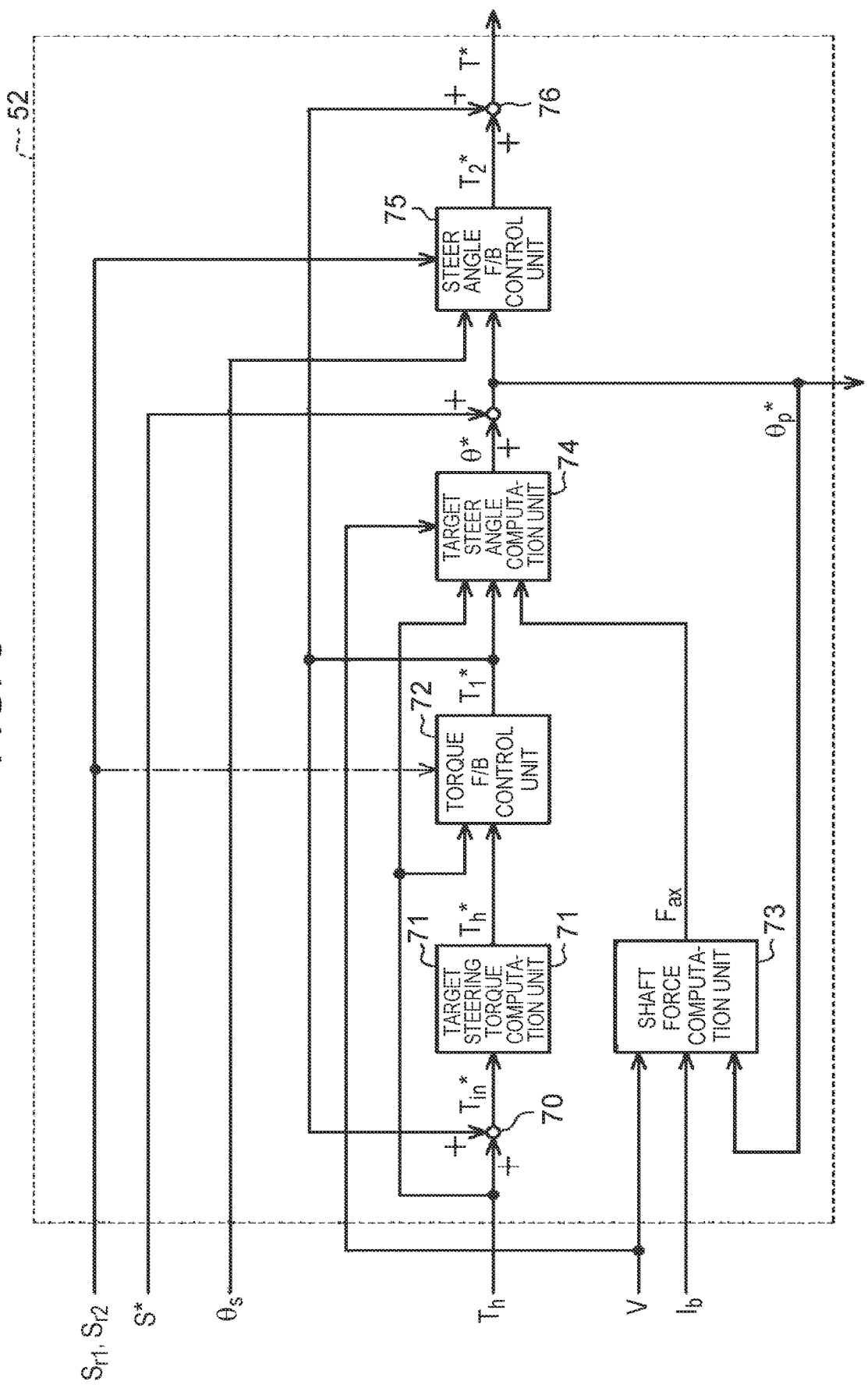
FIG. 3 is a control block diagram of a steering reaction force command value computation unit in the first embodiment.

Next, the steering reaction force command value computation unit 52 will be described in detail. As shown in FIG. 3, the steering reaction force command value computation unit 52 includes an adder 70, a target steering torque computation unit 71, a torque feedback control unit 72, a shaft force computation unit 73, a target steer angle computation unit 74, a steer angle feedback control unit 75 and an adder 76.

The adder 70 computes an input torque Tin* as a torque that is applied to the steering shaft 12, by adding the steering torque Th detected through the torque sensor 34 and a first steering reaction force command value T1* computed by the torque feedback control unit 72.

The target steering torque computation unit 71 computes a target steering torque Th* based on the input torque Tin* computed by the adder 70. The target steering torque Th* is a target value of the steering torque Th that needs to be applied to the steering wheel 11. The target steering torque computation unit 71 computes the target steering torque Th* having a larger absolute value, as the absolute value of the input torque Tin* is larger.

The torque feedback control unit 72 takes in the steering torque Th detected through the torque sensor 34 and the target steering torque Th* computed by the target steering torque computation unit 71. The torque feedback control unit 72 computes the first steering reaction force command value T1* through a feedback control of the steering torque Th, such that the steering torque Th detected through the torque sensor 34 follows up the target steering torque Th*.

The shaft force computation unit 73 takes in the target steer angle θ* computed by the target steer angle computation unit 74, as the target pinion angle θp*. Further, the shaft force computation unit 73 takes in the value of the electric current Ib of the turning motor 41 detected through the current sensor 64 and the vehicle speed V detected through the vehicle speed sensor 501. The shaft force computation unit 73 computes a shaft force Fax that acts on the turning shaft 14 through the turning wheels 16, based on the target pinion angle θp*, the value of the electric current Ib of the turning motor 41 and the vehicle speed V. Details are shown as follows.

Based on the target pinion angle θp*, the shaft force computation unit 73 computes an ideal shaft force F1 that is an ideal value of the shaft force that acts on the turning shaft 14 through the turning wheels 16. The shaft force computation unit 73 computes the ideal shaft force F1, using an ideal shaft force map stored in an unillustrated storage device of the control device 50. The ideal shaft force F1 is set to a larger absolute value, as the absolute value of the target pinion angle θp* (or a target turning angle obtained by multiplying the target pinion angle θp* by a predetermined conversion factor) increases and the vehicle speed V is lower. It is not always necessary to consider the vehicle speed V.

The shaft force computation unit 73 computes an estimated shaft force F2 that acts on the turning shaft 14, based on the value of the electric current Ib of the turning motor 41. Here, a disturbance corresponding to a road surface state (the frictional resistance of the road surface) acts on the turning wheels 16, and thereby a difference between the target pinion angle θp* and the actual pinion angle θp is generated, so that the value of the electric current Ib of the turning motor 41 changes. That is, the value of the electric current Ib of the turning motor 41 reflects the actual road surface reaction force that acts on the turning wheels 16. Therefore, it is possible to compute the shaft force that reflects the influence of the road surface state, based on the value of the electric current Ib of the turning motor 41. The estimated shaft force F2 is evaluated by multiplying the value of the electric current Ib of the turning motor 41 by a gain that is a coefficient depending on the vehicle speed V.

The shaft force computation unit 73 individually sets a distribution ratio (gain) for the ideal shaft force F1 and a distribution ratio for the estimated shaft force F2. The shaft force computation unit 73 computes a mixed shaft force F3, by summing up values resulting from multiplying the ideal shaft force F1 and the estimated shaft force F2 by the individually set distribution ratios respectively. The distribution ratio is set depending on various state variables that reflect vehicle behavior, the road surface state or the steering state.

The target steer angle computation unit 74 takes in the steering torque Th detected through the torque sensor 34, the first steering reaction force command value T1* computed by the torque feedback control unit 72, the shaft force Fax computed by the shaft force computation unit 73, and the vehicle speed V detected through the vehicle speed sensor 501. The target steer angle computation unit 74 computes the target steer angle θ* of the steering wheel 11, based on the taken steering torque Th, first steering reaction force command value T1*, shaft force Fax and vehicle speed V. Details are shown as follows.

The target steer angle computation unit 74 evaluates the final input torque Tin* for the steering wheel 11, by subtracting a torque conversion value (a steering reaction force corresponding to the shaft force) resulting from converting the shaft force Fax into a torque from the input torque Tin* that is the total of the first steering reaction force command value T1* and the steering torque Th. The target steer angle computation unit 74 computes the target steer angle θ* (target steering angle) from the final input torque Tin*, based on an ideal model expressed by the following Expression (A). In the ideal model, the steer angle (steering angle) of the steering wheel 11 corresponding to an ideal turning angle depending on the input torque Tin* is previously modeled by an experiment or the like, on the premise of a steering apparatus in which the steering wheel 11 and the turning wheels 16 are mechanically coupled.

$$Tin^* = J\theta^{*\prime\prime} + C\theta^{*\prime} + K\theta^* \quad (A)$$

where "J" is an inertia coefficient corresponding to an inertia moment of the steering wheel 11 and the steering shaft 12, "C" is a viscosity coefficient (friction coefficient) corresponding to the friction and the like between the turning shaft 14 and the housing, and "K" is a spring modulus when each of the steering wheel 11 and the steering shaft 12 is regarded as a spring. The viscosity coefficient C and the inertia coefficient J are values depending on the vehicle speed V. Further, "θ*″" is a second-order temporal differentiation value of the target steer angle θ*, and "θ*′" is a first-order temporal differentiation value of the target steer angle θ*.

Incidentally, in the case where the additional angle command value is computed as the command value S* through the execution of the driving assist control or the automatic driving control by the host control device 500, the command value S* is added to the target steer angle θ* computed by the target steer angle computation unit 74. The final target steer angle θ* after the addition of the command value S* is supplied to each of the shaft force computation unit 73 and the steer angle feedback control unit 75.

The steer angle feedback control unit 75 takes in the steer angle θs computed by the steer angle computation unit 51 and the target steer angle θ* computed by the target steer angle computation unit 74. The steer angle feedback control unit 75 computes a second steering reaction force command value T2* through the feedback control of the steer angle θs, such that the actual steer angle θs computed by the steer angle computation unit 51 follows up the target steer angle θ*.

The adder 76 computes the steering reaction force command value T* by adding the first steering reaction force command value T1* computed by the torque feedback control unit 72 and the second steering reaction force command value T2* computed by the steer angle feedback control unit 75.

Steer Angle Feedback Control Unit

Next, the steer angle feedback control unit 75 will be described in detail. In the embodiment, the steer angle feedback control unit 75 executes a proportional control as the feedback control.

Figure 4:
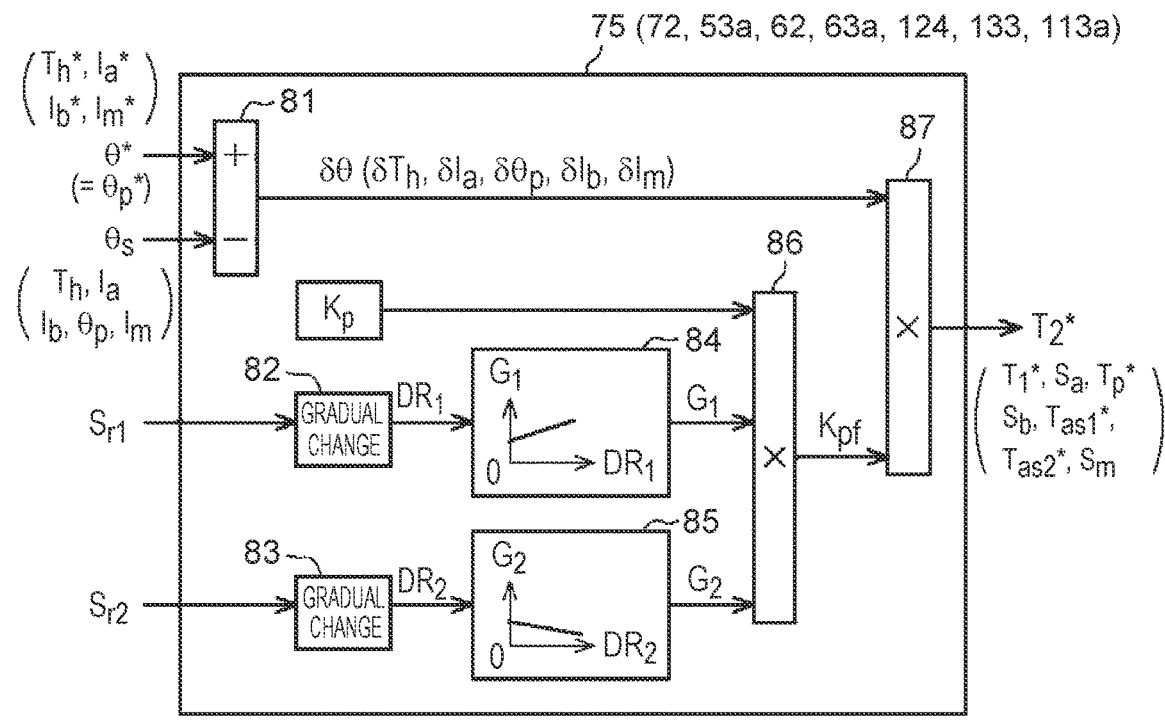
FIG. 4 is a control block diagram of a steer angle feedback control unit in the first embodiment (third to sixth embodiments)

As shown in FIG. 4, the steer angle feedback control unit 75 includes a subtractor 81, two gradual-change processing units 82, 83, two gain computation units 84, 85, and two multipliers 86, 87. The constituent elements (81 to 87) constitute a proportional controller that is a controller. The proportional controller computes a manipulated variable having a value proportional to the difference between a target value and a current value. In the embodiment, the target value is the target steer angle θ*, the current value is the steer angle θs, and the steering amount is the second steering reaction force command value T2*.

The subtractor 81 evaluates a difference δθ by subtracting the steer angle θs computed by the steer angle computation unit 51 from the target steering angle θ* computed by the target steer angle computation unit 74. The gradual-change processing unit 82 takes in the flag as the command Sr1 generated by the host control device 500. The gradual-change processing unit 82 computes an automatic driving rate DR1 by performing a gradual-change process of the value of the flag as the command Sr1 with respect to time (a process for gradually changing the value). The automatic driving rate DR1 corresponds to the command value S1* computed by the host control device 500.

The gradual-change processing unit 83 takes in the flag as the command Sr2 generated by the host control device 500. The gradual-change processing unit 83 computes an automatic driving rate DR2 by performing a gradual-change process of the value of the flag as the command Sr2 with respect to time. The automatic driving rate DR2 corresponds to the command value S2* computed by the host control device 500.

Incidentally, the automatic driving rate is the value indicating the degree of involvement in the driving of the vehicle by the system (the degree of the intervention in the steering control by the host control device 500 in the embodiment).

The degree of the involvement in the driving by the system increases as the driving assist system becomes more complex or sophisticated with enhancement of technology level. For example, when the automatic driving rate is "1 (100%)", the system fully performs the driving instead of the driver. Conversely, when the automatic driving rate is "0(%)", the driver performs all of recognition of traveling environment, judgement of danger, and the driving operation (steering, acceleration, deceleration and the like) of the vehicle.

As the gradual-change processing units 82, 83, for example, one of two configurations (a1), (a2) described below is employed.

(a1) The gradual-change processing units 82, 83 have a so-called change amount guard function with respect to time, which is a function to limit the change amounts of the values of the flags as the commands Sr1, Sr2 per unit time to predetermined limit values. The gradual-change processing units 82, 83 may alter the limit values depending on steering speed, target steering speed, steering torque or steering torque differentiation value.

(a2) As the gradual-change processing units 82, 83, low-pass filters are employed. Each low-pass filter may alter cutoff frequency depending on the steering speed, the target steering speed, the steering torque or the steering torque differentiation value.

The gain computation unit 84 computes a gain G1 for the command value S1* computed by the host control device 500, based on the automatic driving rate DR1 computed by the gradual-change processing unit 82. The gain G1 is computed from a standpoint of adjustment of the responsiveness for the first driving assist control depending on the automatic driving rate DR1. For example, the gain computation unit 84 computes the gain G1 having a larger value as the value of the automatic driving rate DR1 is larger.

The gain computation unit 85 computes a gain G2 for the command value S2* computed by the host control device 500, based on the automatic driving rate DR2 computed by the gradual-change processing unit 83. The gain G2 is computed from a standpoint of adjustment of the responsiveness for the second driving assist control depending on the automatic driving rate DR2. For example, the gain computation unit 85 computes the gain G2 having a smaller value as the value of the automatic driving rate DR2 is larger.

The multiplier 86 computes a final proportional gain Kpf by multiplying a proportional gain Kp stored as a standard value in the unillustrated storage device provided in the control device 50 by the gain G1 computed by the gain computation unit 84 and the gain G2 computed by the gain computation unit 85.

The multiplier 87 computes the second steering reaction force command value T2* by multiplying the difference δθ computed by the subtractor 81 by the final proportional gain Kpf computed by the multiplier 86.

Operation of First Embodiment

Next, the operation of the first embodiment will be described. The responsiveness of the steer angle feedback control that is executed by the steer angle feedback control unit 75 increases as the value of the proportional gain Kp is larger, and decreases as the value of the proportional gain Kp is smaller. Further, the silence of the steering apparatus 10 decreases as the responsiveness of the steer angle feedback control is higher, and increases as the responsiveness of the steer angle feedback control is lower.

When the first driving assist control function is switched from the off-state to the on-state, the host control device 500 switches the value of the flag as the command Sr1 from "0" to "1". At this time, as the automatic driving rate DR1, the gradual-change processing unit 82 gradually changes the value of the flag as the command Sr1 from "0" to "1", for example, on a "0.1" basis. With the increase in the automatic driving rate DR1, the value of the gain G1 gradually increases also. Therefore, the value of the final proportional gain Kpf, which is obtained by multiplying the proportional gain Kp as the standard value by the gain G1, gradually increases also. Accordingly, the responsiveness of the steer angle feedback control increases compared to the case where the standard value is used as the proportional gain Kp. In the first driving assist, from a standpoint of securement of a higher safety, it is desirable to reflect the command value S* computed by the host control device 500 in the target steer angle θ* more quickly.

When the second driving assist control function is switched from the off-state to the on-state, the host control device 500 switches the value of the flag as the command Sr2 from "0" to "1". At this time, as the automatic driving rate DR2, the gradual-change processing unit 83 gradually changes the value of the flag as the command Sr2 from "0" to "1", for example, on a "0.1" basis. With the increase in the automatic driving rate DR2, the value of the gain G2 gradually decreases. Therefore, the value of the final proportional gain Kpf, which is obtained by multiplying the proportional gain Kp as the standard value by the gain G2, gradually decreases also. Accordingly, the responsiveness of the steer angle feedback control decreases compared to the case where the standard value is used as the proportional gain Kp. Because of the decrease in the responsiveness of the steer angle feedback control, the silence of the steering apparatus 10 increases.

Incidentally, it is expected that the vehicle speed V at the time of parking is a very low speed. Further, at the time of parking, it is necessary to rotate the steering wheel 11 to a larger extent. Therefore, it is likely that the reaction force of the road surface, and furthermore the shaft force that acts on the turning shaft 14 are larger values. Further, it is likely that the value of the target steer angle θ* is set to a larger value. That is, the reaction motor 31 and the turning motor 41 need to generate larger torques, and therefore sound and vibration are easily generated by actuation of the reaction motor 31 and the turning motor 41. Accordingly, at the time of parking, the silence of the steering apparatus 10 can be required instead of the responsiveness of the steer angle feedback control.

Effects of First Embodiment

Accordingly, with the first embodiment, it is possible to obtain the following effects.

(1) The responsiveness of the feedback control in the control device 50 is altered depending on execution situation of the driving assist. Specifically, the value of the proportional gain Kp that is a control parameter for the steer angle feedback control unit 75 is set to an appropriate value depending on the content of the driving assist. Therefore, it is possible to obtain a more appropriate control characteristic (responsiveness and silence) depending on the content of the driving assist control that is executed by the control device 50.

Incidentally, the shaft force that acts on the turning shaft 14 changes depending on the vehicle speed V. Further, the optimal value of the proportional gain Kp differs depending on the magnitude of the shaft force. From this standpoint also, it is desirable to alter the value of the proportional gain Kp depending on the content of the driving assist that differs in an expected vehicle speed range.

(2) When the automatic driving rates DR1, DR2 are immediately switched between "0" and "1", there is a fear that the value of the final proportional gain Kpf rapidly increases or rapidly decreases, although depending on the difference δθ. In this respect, in the embodiment, when the first driving assist control function or the second driving assist control function is switched between the on-state and the off-state, the rapid change in the automatic driving rates DR1, DR2 is restrained through the execution of the gradual-change process by the gradual-change processing units 82, 83. Therefore, it is possible to restrain the rapid change in the second steering reaction force command value T2* and furthermore the steering reaction force that is given to the steering wheel 11.

Second Embodiment

Next, a second embodiment of the steering control device will be described. The embodiment is different from the first embodiment in the configuration of the steer angle feedback control unit 75 (proportional controller).

Figure 5:
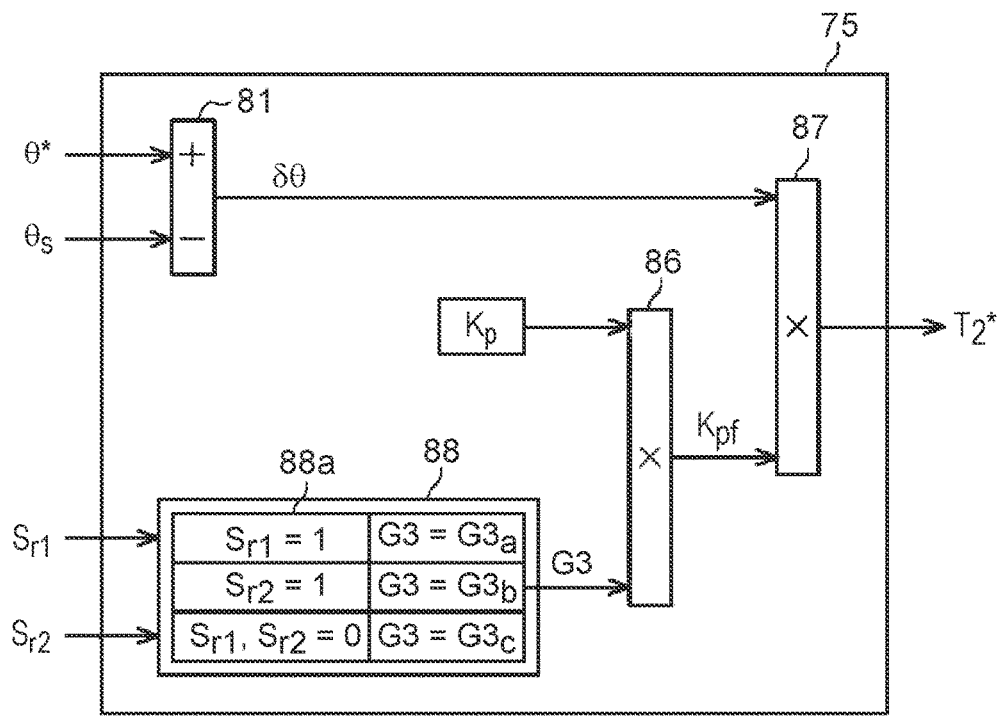
FIG. 5 is a control block diagram of a steer angle feedback control unit in a second embodiment (third to sixth embodiments)

As shown in FIG. 5, the steer angle feedback control unit 75 includes a single gain computation unit 88, in addition to the subtractor 81 and the two multipliers 86, 87. Each of the two gradual-change processing units 82, 83 and the gain computation units 84, 85 shown in FIG. 4 is excluded.

The gain computation unit 88 includes table data 88a. The gain computation unit 88 computes a gain G3 by referring to the table data 88a. The table data 88a is information specifying a correspondence relation between the values ("1" or "0") of the commands Sr1, Sr2 and the gain G3. The gain computation unit 88 sets the value of the gain G3 depending on the values of the commands Sr1, Sr2. Details are shown as follows.

When the value of the flag as the command Sr1 is "1", that is, when the first driving assist control function is in the on-state, the gain computation unit 88 sets a gain G3a as the gain G3. Further, when the value of the flag as the command Sr2 is "1", that is, when the second driving assist control function is in the on-state, the gain computation unit 88 sets a gain G3b as the gain G3. Further, when each of the values of the flags as the commands Sr1, Sr2 is "0", that is, when each of the first driving assist control function and the second driving assist control function is in the off-state, the gain computation unit 88 sets a gain G3c as the gain G3.

The values of the three gains G3a, G3b, G3c are set through an experiment or a simulation, from a standpoint of adjustment of the value of the proportional gain Kp for obtaining the control characteristic (responsiveness and silence in the embodiment) that is required of the control device 50 when the control device 50 executes the first driving assist control or the second driving assist control.

The gain G3a is set from a standpoint of alteration of the value of the final proportional gain Kpf to a larger value than the standard value for increasing the responsiveness of the steer angle feedback control. The gain G3b is set from a standpoint of alteration of the value of the final proportional gain Kpf to a smaller value than the standard value for decreasing the responsiveness of the steer angle feedback control. The gain G3c is set from a standpoint of maintenance of the value of the final proportional gain Kpf at the standard value when it is not necessary to adjust the responsiveness of the steer angle feedback control, for example. The value of the gain G3c is set to "1", for example. The magnitude relation of the gains G3a, G3b, G3c is shown by the following Expression (B).

$$G3a > G3c > G3b > 0 \tag{B}$$

In the case where the gain G3a is computed by the gain computation unit 88, the gain G3a and the proportional gain Kp as the standard value are multiplied by the multiplier 86, so that the final proportional gain Kpf having a larger value than the standard value is computed. In the case where the gain G3b is computed by the gain computation unit 88, the gain G3b and the proportional gain Kp as the standard value are multiplied by the multiplier 86, so that the final proportional gain Kpf having a smaller value than the standard value is computed. In the case where the gain G3c is computed by the gain computation unit 88, the gain G3c (G3c=1 in the embodiment) and the proportional gain Kp as the standard value are multiplied by the multiplier 86, so that the final proportional gain Kpf having the same value as the standard value is computed.

Accordingly, with the second embodiment, it is possible to obtain the same effect as the effect described in (1) in the first embodiment.

Third Embodiment

Next, a third embodiment of the steering control device will be described. The embodiment is different from the first embodiment in the configuration of the torque feedback control unit 72.

The torque feedback control unit 72 has the same configuration as the steer angle feedback control unit 75 shown in FIG. 4. As shown by reference characters in parentheses in FIG. 4, the torque feedback control unit 72 takes in the commands Sr1, Sr2 generated by the host control device 500, and adjusts the proportional gain Kp depending on the taken commands Sr1, Sr2.

While the steer angle feedback control unit 75 takes in the target steer angle θ* and the steer angle θs, the torque feedback control unit 72 takes in the steering torque Th and the target steering torque Th* computed by the target steering torque computation unit 71. Further, while the subtractor 81 of the steer angle feedback control unit 75 computes the difference δθ between the target steer angle θ* and the steer angle θs, the subtractor 81 of the torque feedback control unit 72 computes a difference δTh between the target steering torque Th* and the steering torque Th. The multiplier 87 of the torque feedback control unit 72 computes the first steering reaction force command value T1* by multiplying the difference δTh between the target steering torque Th* and the steering torque Th by the final proportional gain Kpf after the adjustment depending on the commands Sr1, Sr2.

Accordingly, with the third embodiment, it is possible to obtain the following effect, in addition to the effects described in (1) and (2) in the first embodiment.

(3) The value of the proportional gain Kp that is a control parameter for the torque feedback control unit 72 is set to an appropriate value depending on the content of the driving assist. Therefore, it is possible to obtain a more appropriate control characteristic (responsiveness and silence) depending on the content of the driving assist control that is executed by the control device 50.

Fourth Embodiment

Next, a fourth embodiment of the steering control device will be described. The embodiment is different from the first embodiment in the configuration of the energization control unit 53 shown in FIG. 2.

The energization control unit 53 includes a current command value computation unit, a current feedback control unit and a drive circuit (inverter circuit). The current command value computation unit computes the current command value for the reaction motor 31 based on the steering reaction force command value T*. The current command value is a target value of an electric current that needs to be supplied to the reaction motor 31 and that is necessary to generate the target steering reaction force having an appropriate magnitude corresponding the steering reaction force command value T*. The current feedback control unit generates a motor control signal through a feedback control of the electric current Ia, such that the value of the actual electric current Ia that is detected through the current sensor 54 follows up the current command value. The drive circuit supplies an electric current corresponding to the motor control signal, to the reaction motor 31. Thereby, the reaction motor 31 generates a torque corresponding to the steering reaction force command value T*.

The current feedback control unit 53a has the same configuration as the steer angle feedback control unit 75 shown in FIG. 4. As shown by reference characters in parentheses in FIG. 4, a current feedback control unit 53a takes in the commands Sr1, Sr2 generated by the host control device 500, and adjusts the proportional gain Kp depending on the taken commands Sr1, Sr2.

While the steer angle feedback control unit 75 takes in the target steer angle $\theta^*$ and the steer angle $\theta s$, the current feedback control unit 53a takes in the value of the actual electric current Ia detected through the current sensor 54 and the current command value Ia* computed by the current command value computation unit. Further, while the subtractor 81 of the steer angle feedback control unit 75 computes the difference $\delta\theta$ between the target steer angle $\theta^*$ and the steer angle $\theta s$, the subtractor 81 of the current feedback control unit 53a computes a difference $\delta$Ia between the current command value Ia* and the value of the actual electric current Ia. The multiplier 87 of the current feedback control unit 53a computes a motor control signal Sa for the reaction motor 31, by multiplying the difference $\delta$Ia between the current command value Ia* and the value of the actual electric current Ia by the final proportional gain Kpf after the adjustment depending on the commands Sr1, Sr2.

Accordingly, with the fourth embodiment, it is possible to obtain the following effect, in addition to the effects described in (1) and (2) in the first embodiment.

(4) The value of the proportional gain Kp that is a control parameter for the current feedback control unit 53a is set to an appropriate value depending on the content of the driving assist. Therefore, it is possible to obtain a more appropriate control characteristic (responsiveness and silence) depending on the content of the driving assist control that is executed by the control device 50.

Fifth Embodiment

Next, a fifth embodiment of the steering control device will be described. The embodiment is different from the first embodiment in the configuration of the pinion angle feedback control unit 62 shown in FIG. 2.

The pinion angle feedback control unit 62 has the same configuration as the steer angle feedback control unit 75 shown in FIG. 4. As shown by reference characters in parentheses in FIG. 4, the pinion angle feedback control unit 62 takes in the commands Sr1, Sr2 generated by the host control device 500. The proportional gain Kp is adjusted depending on the taken commands Sr1, Sr2.

While the steer angle feedback control unit 75 takes in the target steer angle $\theta^*$ and the steer angle $\theta s$, the pinion angle feedback control unit 62 takes in the target steer angle $\theta^*$ computed by the steering reaction force command value computation unit 52, as the target pinion angle $\theta p^*$. Further, the pinion angle feedback control unit 62 takes in the actual pinion angle $\theta p$ computed by the pinion angle computation unit 61.

Further, while the subtractor 81 of the steer angle feedback control unit 75 computes the difference $\delta\theta$ between the target steer angle $\theta^*$ and the steer angle $\theta s$, the subtractor 81 of the pinion angle feedback control unit 62 computes a difference $\delta\theta p$ between the target pinion angle $\theta p^*$ and the actual pinion angle $\theta p$. The multiplier 87 of the pinion angle feedback control unit 62 computes the pinion angle command value Tp* by multiplying the difference $\delta\theta p$ between the target pinion angle $\theta p^*$ and the actual pinion angle $\theta p$ by the final proportional gain Kpf after the adjustment depending on the commands Sr1, Sr2.

Accordingly, with the fifth embodiment, it is possible to obtain the following effect, in addition to the effects described in (1) and (2) in the first embodiment.

(5) The value of the proportional gain Kp that is a control parameter for the pinion angle feedback control unit 62 is set to an appropriate value depending on the content of the driving assist. Therefore, it is possible to obtain a more appropriate control characteristic (responsiveness and silence) depending on the content of the driving assist control that is executed by the control device 50.

Sixth Embodiment

Next, a sixth embodiment of the steering control device will be described. The embodiment is different from the first embodiment in the configuration of the energization control unit 63 shown in FIG. 2.

The energization control unit 63 includes a current command value computation unit, a current feedback control unit and a drive circuit (inverter circuit). The current command value computation unit computes the current command value for the turning motor 41 based on the pinion angle command value Tp*. The current command value is a target value of an electric current that needs to be supplied to the turning motor 41 and that is necessary to realize an appropriate turning angle $\theta w$ corresponding to the pinion angle command value Tp*. The current feedback control unit generates a motor control signal through a feedback control of the electric current Ib, such that the value of the actual electric current Ib detected through the current sensor 64 follows up the current command value. The drive circuit supplies an electric current corresponding to the motor control signal, to the turning motor 41. Thereby, the turning motor 41 generates a torque corresponding to the pinion angle command value Tp*.

The current feedback control unit has the same configuration as the steer angle feedback control unit 75 shown in FIG. 4. As shown by reference characters in parentheses in FIG. 4, a current feedback control unit 63a takes in the commands Sr1, Sr2 generated by the host control device 500, and adjusts the proportional gain Kp depending on the taken commands Sr1, Sr2.

While the steer angle feedback control unit 75 takes in the target steer angle $\theta^*$ and the steer angle $\theta s$, the current feedback control unit 63a takes in the value of the actual electric current Ib detected through the current sensor 64 and the current command value Ib* computed by the current command value computation unit. Further, while the subtractor 81 of the steer angle feedback control unit 75 computes the difference $\delta\theta$ between the target steer angle $\theta^*$ and the steer angle θs, the subtractor 81 of the current feedback control unit 63a computes a difference δIb between the current command value Ib* and the value of the actual electric current Ib. The multiplier 87 of the current feedback control unit 63a computes a motor control signal Sb for the turning motor 41, by multiplying the difference δIb between the current command value Ib* and the value of the actual electric current Ib by the final proportional gain Kpf after the adjustment depending on the commands Sr1, Sr2.

Accordingly, with the sixth embodiment, it is possible to obtain the following effect, in addition to the effects described in (1) and (2) in the first embodiment.

(6) The value of the proportional gain Kp that is a control parameter for the current feedback control unit 63a is set to an appropriate value depending on the content of the driving assist. Therefore, it is possible to obtain a more appropriate control characteristic (responsiveness and silence) depending on the content of the driving assist control that is executed by the control device 50.

Seventh Embodiment

Next, a seventh embodiment in which the steering control device is embodied as a control device of an electric power steering apparatus (EPS) will be described. The same members as those in the first embodiment are denoted by identical reference characters, and detailed descriptions of the members are omitted.

In the EPS, the steering wheel 11 and the turning wheels 16 shown in FIG. 1 are mechanically coupled to each other. That is, the steering shaft 12, the pinion shaft 13 and the turning shaft 14 function as a dynamic force transmission path between the steering wheel 11 and the turning wheels 16. The turning shaft 14 linearly moves due to the rotation operation of the steering wheel 11, so that the turning angle θw of the turning wheels 16, is altered. Further, the EPS includes an assist motor that is provided at the same position as the position of one of the reaction motor 31 and the turning motor 41 shown in FIG. 1. The assist motor generates a steering assist force (assist force).

Figure 6:
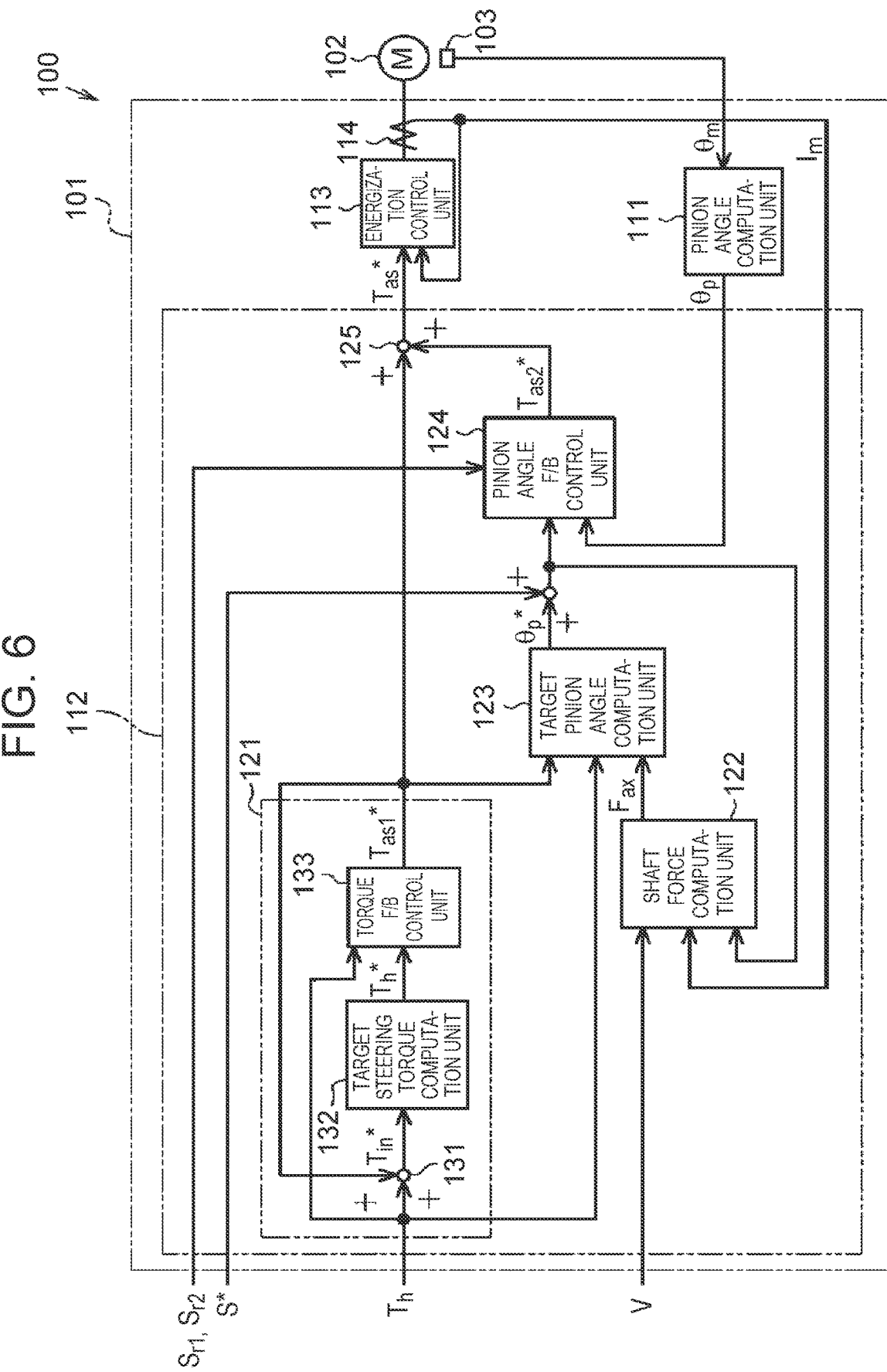
FIG. 6 is a control block diagram in a seventh embodiment in which the steering control device is applied to an electric power steering apparatus.

As shown in FIG. 6, a control device 101 of an EPS 100 executes an assist control to generate a steering assist force corresponding to the steering torque Th through an energization control for an assist motor 102. The control device 101 controls electricity supply for the assist motor 102, based on the steering torque Th detected through the torque sensor 34, the vehicle speed V detected through the vehicle speed sensor 501 and a rotation angle θm detected through a rotation angle sensor 103 that is provided on the assist motor 102.

The control device 101 includes a pinion angle computation unit 111, an assist command value computation unit 112 and an energization control unit 113. The pinion angle computation unit 111 takes in the rotation angle θm of the assist motor 102, and computes the pinion angle θp that is the rotation angle of the pinion shaft 13, based on the taken rotation angle θm. The assist command value computation unit 112 computes an assist command value Tas* based on the steering torque Th and the vehicle speed V. The assist command value Tas* is a command value indicating an assist torque that is a rotation force that needs to be generated by the assist motor 102. The energization control unit 113 supplies an electric power corresponding to the assist command value Tas*, to the assist motor 102. A current sensor 114 is provided on an electricity supply path to the assist motor 102. The current sensor 114 detects the value of an actual electric current Im that is supplied to the assist motor 102.

Next, the configuration of the assist command value computation unit 112 will be described in detail. The assist command value computation unit 112 includes a basic assist torque computation unit 121, a shaft force computation unit 122, a target pinion angle computation unit 123, a pinion angle feedback control unit (pinion angle F/B control unit) 124 and an adder 125.

The basic assist torque computation unit 121 computes a basic assist torque Tas1* based on the steering torque Th. The basic assist torque computation unit 121 includes an adder 131, a target steering torque computation unit 132 and a torque feedback control unit 133. The adder 131 computes the input torque Tin* as the torque that is applied to the steering shaft 12, by adding the steering torque Th detected through the torque sensor 34 and the basic assist torque Tas1* computed by the torque feedback control unit 133. The target steering torque computation unit 132 computes the target steering torque Th* based on the input torque Tin* computed by the adder 131. The target steering torque computation unit 132 computes the target steering torque Th* having a larger absolute value, as the absolute value of the input torque Tin* is larger. The torque feedback control unit 133 takes in the steering torque Th detected by the torque sensor 34 and the target steering torque Th* computed by the target steering torque computation unit 132. The torque feedback control unit 133 computes the basic assist torque Tas1* through the feedback control of the steering torque Th, such that the steering torque Th detected through the torque sensor 34 follows up the target steering torque Th*.

The shaft force computation unit 122 has the same function as the shaft force computation unit 73 in the first embodiment shown in FIG. 3. The shaft force computation unit 122 takes in the value of the electric current Im of the assist motor 102 detected through the current sensor 114, the target pinion angle θp* computed by the target pinion angle computation unit 123, and the vehicle speed V detected through the vehicle speed sensor 501. The shaft force computation unit 122 computes the shaft force Fax that acts on the turning shaft 14, based on the value of the electric current Im of the assist motor 102, the target pinion angle θp* and the vehicle speed V.

The target pinion angle computation unit 123 has the same function as the target steer angle computation unit 74 in the first embodiment shown in FIG. 3. The target pinion angle computation unit 123 computes the target pinion angle θp* based on the ideal model expressed by Expression (A), using the basic assist torque Tas1* computed by the basic assist torque computation unit 121, the steering torque Th detected through the torque sensor 34, and the shaft force Fax computed by the shaft force computation unit 122.

The pinion angle feedback control unit 124 has the same function as the steer angle feedback control unit 75 in the first embodiment shown in FIG. 3. The pinion angle feedback control unit 124 takes in each of the target pinion angle θp* calculated by the target pinion angle computation unit 123 and the actual pinion angle θp calculated by the pinion angle computation unit 111. The pinion angle feedback control unit 124 performs a feedback control of the pinion angle θp, such that the actual pinion angle θp follows up the target pinion angle θp*. That is, the pinion angle feedback control unit 124 evaluates the deviation between the target pinion angle θp* and the actual pinion angle θp, and computes a correction assist torque Tas2* as a correction component for the basic assist torque Tas1*, such that the deviation is eliminated.

The adder 125 computes the assist command value Tas* by summing up the basic assist torque Tas1* computed by the basic assist torque computation unit 121 and the correction assist torque Tas2* computed by the pinion angle feedback control unit 124.

The energization control unit 113 computes a current command value for the assist motor 102, based on the assist command value Tas*. Further, the energization control unit 113 takes in the value of the electric current Im detected through the current sensor 114. Then, the energization control unit 113 evaluates the deviation between the current command value and the value of the actual electric current Im, and controls the electricity supply for the assist motor 102 such that the deviation is eliminated. Thereby, the assist motor 102 generates a torque corresponding to the assist command value Tas*. That is, the steering assist corresponding to the steering state is performed.

Pinion Angle Feedback Control Unit

The pinion angle feedback control unit 124 has the same configuration as the steer angle feedback control unit 75 shown in FIG. 4. As shown by reference characters in parentheses in FIG. 4, the pinion angle feedback control unit 124 takes in the commands Sr1, Sr2 generated by the host control device 500, and adjusts the proportional gain Kp depending on the taken Sr1, Sr2.

While the steer angle feedback control unit 75 takes in the target steer angle θ* and the steer angle θs, the pinion angle feedback control unit 124 takes in the target pinion angle θp* computed by the target pinion angle computation unit 123 and the actual pinion angle θp computed by the pinion angle computation unit 111.

Further, while the subtractor 81 of the steer angle feedback control unit 75 computes the difference δθ between the target steer angle θ* and the steer angle θs, the subtractor 81 of the pinion angle feedback control unit 124 computes the difference δθp between the target pinion angle θp* and the actual pinion angle θp. The multiplier 87 of the pinion angle feedback control unit 124 computes the correction assist torque Tas2* by multiplying the difference δθp between the target pinion angle θp* and the actual pinion angle θp by the final proportional gain Kpf after the adjustment depending on the commands Sr1, Sr2.

Torque Feedback Control Unit

The torque feedback control unit 133 has the same configuration as the steer angle feedback control unit 75 shown in FIG. 4. As shown by reference characters in parentheses in FIG. 4, the torque feedback control unit 133 takes in the commands Sr1, Sr2 generated by the host control device 500, and adjusts the proportional gain Kp depending on the taken commands Sr1, Sr2.

While the steer angle feedback control unit 75 takes in the target steer angle θ* and the steer angle θs, the torque feedback control unit 133 takes in the steering torque Th detected through the torque sensor 34 and the target steering torque Th* computed by the target steering torque computation unit 132. Further, while the subtractor 81 of the steer angle feedback control unit 75 computes the difference δθ between the target steer angle θ* and the steer angle θs, the subtractor 81 of the torque feedback control unit 133 computes the difference δTh between the target steering torque Th* and the steering torque Th. The multiplier 87 of the torque feedback control unit 133 computes the basic assist torque Tas1* by multiplying the difference δTh between the target steering torque Th* and the steering torque Th by the final proportional gain Kpf after the adjustment depending on the commands Sr1, Sr2.

Energization Control Unit

The energization control unit 113 includes a current command value computation unit, a current feedback control unit and a drive circuit (inverter circuit). The current command value computation unit computes a current command value for the assist motor 102 based on the assist command value Tas*. The current command value is a target value of an electric current that needs to be supplied to the assist motor 102 and that is necessary to generate a target assist force having an appropriate magnitude corresponding to the assist command value Tas*. The current feedback control unit generates a motor control signal through a feedback control of the electric current Im, such that the value of the actual electric current Im detected through the current sensor 114 follows up the current command value. The drive circuit supplies an electric current corresponding to the motor control signal, to the assist motor 102. Thereby, the assist motor 102 generates a torque corresponding to the assist command value Tas*.

The current feedback control unit has the same configuration as the steer angle feedback control unit 75 shown in FIG. 4. As shown by reference characters in parentheses in FIG. 4, a current feedback control unit 113a takes in the commands Sr1, Sr2 generated by the host control device 500, and adjusts the proportional gain Kp depending on the taken commands Sr1, Sr2.

While the steer angle feedback control unit 75 takes in the target steer angle θ* and the steer angle θs, the current feedback control unit 113a takes in the value of the actual electric current Im detected through the current sensor 114 and a current command value Im* computed by the current command value computation unit. Further, while the subtractor 81 of the steer angle feedback control unit 75 computes the difference δθ between the target steer angle θ* and the steer angle θs, the subtractor 81 of the current feedback control unit 113a computes a difference θ Im between the current command value Im* and the value of the actual electric current Im. The multiplier 87 of the current feedback control unit 113a computes a motor control signal Sm for the assist motor 102, by multiplying the difference δIm between the current command value Im* and the value of the actual electric current Im by the final proportional gain Kpf after the adjustment depending on the commands Sr1, Sr2.

Accordingly, with the seventh embodiment, in the steering apparatus in which the dynamic force transmission between the steering wheel 11 and the turning wheels 16 is mechanically connected, it is possible to obtain the following effect, in addition to the effects described in (1) and (2) in the first embodiment.

(7) The value of the proportional gain Kp that is a control parameter for the pinion angle feedback control unit 62 is set to an appropriate value depending on the content of the driving assist. Further, the value of the proportional gain Kp that is a control parameter for the torque feedback control unit 133 is set to an appropriate value depending on the content of the driving assist. Further, the value of the proportional gain Kp that is a control parameter for the current feedback control unit 113a is set to an appropriate value depending on the content of the driving assist. Therefore, it is possible to obtain a more appropriate control characteristic (responsiveness and silence) depending on the content of the driving assist control that is executed by the control device 50.

Other Embodiments

The above embodiments may be carried out while being modified as follows.

In the first embodiment, a configuration in which the gradual-change processing units 82, 83 are excluded from the steer angle feedback control unit 75 may be employed. In this case, the values of the commands Sr1, Sr2 are taken in the gain computation units 84, 85 as the automatic driving rates DR1, DR2. The same goes for the feedback control units in the third to seventh embodiments.

The second embodiment shown in FIG. 5 may be applied to the feedback control units in the third to seventh embodiments.

In the first to seventh embodiments, the host control device 500 can generate automatic driving rates as the commands Sr1, Sr2, instead of the flags ("0" or "1"). In this case also, the automatic driving rates as the commands Sr1, Sr2 are supplied to the gain computation units 84, 85 after gradual-change processes by the gradual-change processing units 82, 83.

In the first embodiment, the steer angle feedback control unit 75 may execute at least one of an integral control and a derivative control, in addition to the above-described proportional control. Similarly to the proportional gain Kp, the values of control parameters (an integral gain Ki and a derivative gain Kd) for the integral control and the derivative control are adjusted depending on the commands Sr1, Sr2. The same goes for other feedback controllers that are controllers other than the steer angle feedback control unit 75 in the first to seventh embodiments.

Incidentally, in the case where the controller, which includes the steer angle feedback control unit 75, executes all of the proportional control, the integral control and the derivative control, a manipulated variable u that is an amount of operation of a control object for obtaining a target value is expressed by the following Expression (C).

$$u = Kp \cdot \varepsilon + Ki \cdot \text{(integrated value of } \varepsilon) + Kd \cdot \varepsilon' \quad (C)$$

where "$\varepsilon$" is the deviation between the target value and the actual value, "$\varepsilon'$" is the derivative value resulting from differentiating the deviation $\varepsilon$, "Kp" is the proportional gain, "Ki" is the integral gain, and "Kd" is the derivative gain.

In addition to the proportional term, the integral term and the derivative term, at least one of a disturbance observer term, a dumping term and a feedforward term (F/F term) may be added to Expression (C).

In the first to sixth embodiments, the following configuration may be employed as the steering reaction force command value computation unit 52 shown in FIG. 3. That is, in the steering reaction force command value computation unit 52, a target steering reaction force computation unit that computes the first steering reaction force command value T1* as the target steering reaction force is provided instead of the target steering torque computation unit 71 and torque feedback control unit 72 shown in FIG. 3. The target steering reaction force computation unit computes the first steering reaction force command value T1* as the target steering reaction force, for example, using a three-dimensional map that specifies the relation between the steering torque Th and the target steering reaction force depending on the vehicle speed V, instead of the feedback control of the steering torque Th.

Incidentally, the target steering reaction force computation unit may take in the shaft force Fax of the turning shaft 14 computed by the shaft force computation unit 73, in addition to the steering torque Th and the vehicle speed V, and may compute the first steering reaction force command value T1* based on the taken steering torque Th, vehicle speed V and shaft force Fax. Further, the target steering reaction force computation unit may take in only the shaft force Fax computed by the shaft force computation unit 73, without taking in the steering torque Th and the vehicle speed V, and may compute the first steering reaction force command value T1* as the target steering reaction force, based on the taken shaft force Fax.

In the seventh embodiment, the following configuration may be employed as the basic assist torque computation unit 121 shown in FIG. 6. That is, the basic assist torque computation unit 121 computes the basic assist torque Tas1*, using a three-dimensional map that specifies the relation between the steering torque Th and the basic assist torque Tas1* depending on the vehicle speed V, instead of the feedback control of the steering torque Th. The basic assist torque computation unit 121 sets the absolute value of the basic assist torque Tas1* to a larger value, as the absolute value of the steering torque Th is larger and the vehicle speed V is lower.

In the first to sixth embodiments, a clutch may be provided in the steering apparatus 10. In this case, as shown by a two-dot chain line in FIG. 1, the steering shaft 12 and the pinion shaft 13 are coupled through the clutch 21. As the clutch 21, an electromagnetic clutch that connects and disconnects dynamic force by electric connection and disconnection of an exciting coil is employed. The control device 50 executes a connection-disconnection control to switch the clutch 21 between connection and disconnection. When the clutch 21 is disconnected, the dynamic force transmission between the steering wheel 11 and the turning wheels 16 is mechanically disconnected. When the clutch 21 is connected, the dynamic force transmission between the steering wheel 11 and the turning wheels 16 is mechanically connected.

What is claimed is:

1. A steering control device configured to control a motor, the motor being a generation source of a driving force that is given to a steering mechanism of a vehicle, the steering control device comprising a controller, the controller being configured to compute a controlled variable depending on a steering state, the controlled variable being used in the control of the motor, the controller being configured to alter a control parameter that the controller uses to compute the controlled variable, the control parameter being altered based on a command for performing driving assist function that differs within an expected vehicle speed range, the command being generated by a host control device depending on a purpose of an intervention in a steering control, the host control device being mounted on the vehicle.

2. The steering control device according to claim 1, wherein the controller is configured to compute the controlled variable by executing a feedback control to cause a detection value of a physical quantity to follow up a target value of the physical quantity, the physical quantity changing depending on an action of the steering mechanism.

3. The steering control device according to claim 1, wherein:
   the steering control device is configured to control the motor including a turning motor that generates a turning force for turning a turning wheel as the driving force that is given to a turning shaft of the steering mechanism, the turning shaft being configured to turn the turning wheel, dynamic force transmission between a steering wheel and the turning wheel being isolated; and the controller is configured to compute the controlled variable by executing a feedback control to cause a detection value of a physical quantity to follow up a target value of the physical quantity, the physical quantity changing depending on a turning action of the turning wheel.

4. The steering control device according to claim 3, wherein the controller is configured to compute the controlled variable by executing at least one of a feedback control to cause a detection value of an electric current to follow up a target value of the electric current and a feedback control to cause a detection value of a rotation angle of a shaft to follow up a target value of the rotation angle of the shaft, the electric current being supplied to the turning motor, the shaft rotating depending on the turning action of the turning wheel.

5. The steering control device according to claim 1, wherein:
the steering control device is configured to control the motor including a reaction motor that generates a steering reaction force as the driving force that is given to a steering shaft of the steering mechanism, the steering shaft being configured to rotate in conjunction with an operation of a steering wheel, dynamic force transmission between a turning wheel and the steering shaft being isolated, the steering reaction force being a torque in an opposite direction of a steering direction; and
the controller is configured to compute the controlled variable by executing a feedback control to cause a detection value of a physical quantity to follow up a target value of the physical quantity, the physical quantity changing depending on the operation of the steering wheel.

6. The steering control device according to claim 5, wherein the controller is configured to compute the controlled variable by executing at least one of a feedback control to cause a detection value of an electric current to follow up a target value of the electric current and a feedback control to cause a detection value of a rotation angle of the steering shaft to follow up a target value of the rotation angle of the steering shaft, the electric current being supplied to the reaction motor.

7. The steering control device according to claim 1, wherein:
the steering control device is configured to control an assist motor that generates a steering assist force as the driving force that is given to a shaft or a turning shaft of the steering mechanism, the shaft being configured to rotate in conjunction with an operation of a steering wheel, the turning shaft being configured to turn a turning wheel in conjunction with a rotation of the shaft, the steering assist force being a torque in the same direction as a steering direction; and
the controller is configured to compute the controlled variable by executing a feedback control to cause a detection value of a physical quantity to follow up a target value of the physical quantity, the physical quantity changing depending on the operation of the steering wheel.

8. The steering control device according to claim 7, wherein the controller is configured to compute the controlled variable by executing at least one of a feedback control to cause a detection value of an electric current to follow up a target value of the electric current and a feedback control to cause a detection value of a rotation angle of the shaft to follow up a target value of the rotation angle of the shaft, the electric current being supplied to the assist motor, the shaft rotating in conjunction with the operation of the steering wheel.

9. A steering control device configured to control a motor, the motor being a generation source of a driving force that is given to a steering mechanism of a vehicle, the steering control device comprising a controller, the controller being configured to compute a controlled variable depending on a steering state, the controlled variable being used in the control of the motor, the controller being configured to alter a control parameter that the controller uses to compute the controlled variable, the control parameter being altered based on a command for performing at least two driving assist functions that differ within an expected vehicle speed range, the command being generated by a host control device depending on a purpose of an intervention in a steering control, the host control device being mounted on the vehicle, the control parameter being altered differently depending on whether the host control device commands (i) a parking assist function in a very low speed range, or (ii) at least one of a lane departure prevention assist function and a collision avoidance assist function in a vehicle speed range other than the very low speed range.

10. The steering control device according to claim 9, wherein the controller is configured to compute the controlled variable by executing a feedback control to cause a detection value of a physical quantity to follow up a target value of the physical quantity, the physical quantity changing depending on an action of the steering mechanism.

11. The steering control device according to claim 9, wherein:
the steering control device is configured to control the motor including a turning motor that generates a turning force for turning a turning wheel as the driving force that is given to a turning shaft of the steering mechanism, the turning shaft being configured to turn the turning wheel, dynamic force transmission between a steering wheel and the turning wheel being isolated; and
the controller is configured to compute the controlled variable by executing a feedback control to cause a detection value of a physical quantity to follow up a target value of the physical quantity, the physical quantity changing depending on a turning action of the turning wheel.

12. The steering control device according to claim 11, wherein the controller is configured to compute the controlled variable by executing at least one of a feedback control to cause a detection value of an electric current to follow up a target value of the electric current and a feedback control to cause a detection value of a rotation angle of a shaft to follow up a target value of the rotation angle of the shaft, the electric current being supplied to the turning motor, the shaft rotating depending on the turning action of the turning wheel.

13. The steering control device according to claim 9, wherein:
the steering control device is configured to control the motor including a reaction motor that generates a steering reaction force as the driving force that is given to a steering shaft of the steering mechanism, the steering shaft being configured to rotate in conjunction with an operation of a steering wheel, dynamic force transmission between a turning wheel and the steering shaft being isolated, the steering reaction force being a torque in an opposite direction of a steering direction; and the controller is configured to compute the controlled variable by executing a feedback control to cause a detection value of a physical quantity to follow up a target value of the physical quantity, the physical quantity changing depending on the operation of the steering wheel.

14. The steering control device according to claim 13, wherein the controller is configured to compute the controlled variable by executing at least one of a feedback control to cause a detection value of an electric current to follow up a target value of the electric current and a feedback control to cause a detection value of a rotation angle of the steering shaft to follow up a target value of the rotation angle of the steering shaft, the electric current being supplied to the reaction motor.

15. The steering control device according to claim 9, wherein:

the steering control device is configured to control an assist motor that generates a steering assist force as the driving force that is given to a shaft or a turning shaft of the steering mechanism, the shaft being configured to rotate in conjunction with an operation of a steering wheel, the turning shaft being configured to turn a turning wheel in conjunction with a rotation of the shaft, the steering assist force being a torque in the same direction as a steering direction; and the controller is configured to compute the controlled variable by executing a feedback control to cause a detection value of a physical quantity to follow up a target value of the physical quantity, the physical quantity changing depending on the operation of the steering wheel.

16. The steering control device according to claim 15, wherein the controller is configured to compute the controlled variable by executing at least one of a feedback control to cause a detection value of an electric current to follow up a target value of the electric current and a feedback control to cause a detection value of a rotation angle of the shaft to follow up a target value of the rotation angle of the shaft, the electric current being supplied to the assist motor, the shaft rotating in conjunction with the operation of the steering wheel.

* * * * *